United States Patent
Lin et al.

(10) Patent No.: US 9,751,556 B1
(45) Date of Patent: Sep. 5, 2017

(54) METHOD AND SYSTEM FOR FAULT ISOLATION IN AN ELECTRIC POWER STEERING SYSTEM

(71) Applicant: GM GLOBAL TECHNOLOGY OPERATIONS LLC, Detroit, MI (US)

(72) Inventors: Wen-Chiao Lin, Rochester Hills, MI (US); Youssef A. Ghoneim, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/059,932

(22) Filed: Mar. 3, 2016

(51) Int. Cl.
  *B62D 6/00* (2006.01)
  *B62D 5/04* (2006.01)
(52) U.S. Cl.
  CPC .................. *B62D 5/0481* (2013.01)
(58) Field of Classification Search
  CPC .................. B62D 5/04; G01R 31/34
  See application file for complete search history.

(56) References Cited

U.S. PATENT DOCUMENTS

| | | | | |
|---|---|---|---|---|
| 5,912,539 A * | 6/1999 | Sugitani | .................. | B62D 5/049 180/443 |
| 6,906,484 B1 * | 6/2005 | Berroth | ................... | H02P 6/085 318/292 |
| 7,233,850 B2 * | 6/2007 | Nakano | ................... | B60C 23/00 180/234 |
| 8,204,647 B2 * | 6/2012 | Nakane | ................ | B62D 5/0484 180/402 |
| 8,634,986 B2 | 1/2014 | Ghoneim | | |
| 9,199,666 B2 * | 12/2015 | Pugsley | ................. | B62D 5/049 |
| 2005/0264248 A1 * | 12/2005 | Tsunoda | ................ | B62D 5/049 318/434 |
| 2007/0205041 A1 * | 9/2007 | Nishizaki | ................. | B62D 6/10 180/446 |
| 2011/0307196 A1 * | 12/2011 | Schumacher | ........ | G01R 31/025 702/58 |
| 2012/0191301 A1 * | 7/2012 | Benyo | .................. | B62D 5/0481 701/41 |
| 2012/0319722 A1 * | 12/2012 | Zhang | .................. | G01R 31/346 324/765.01 |
| 2016/0244089 A1 * | 8/2016 | Scotson | .............. | H02P 29/0241 |

* cited by examiner

*Primary Examiner* — Jonathan M Dager
*Assistant Examiner* — Alex C Dunn
(74) *Attorney, Agent, or Firm* — Quinn IP Law

(57) ABSTRACT

A method of isolating a fault in an electric power steering system includes calculating a value for fault signature components. Each of the calculated values of the fault signature components is compared to a respective threshold value, to determine if any of the calculated values of the fault signature components exceeds its respective threshold value. When at least one of the calculated values of the plurality of fault signature components exceeds its respective threshold value, the above threshold comparison results are compared to a fault table that relates pre-calculated threshold comparison results to pre-identified faults, to determine if the above threshold comparison results correspond to a pre-identified fault. Based on the fault table comparison results, a control action is automatically executed to indicate a pre-identified fault or an unknown fault in the electric power steering system.

18 Claims, 2 Drawing Sheets

METHOD AND SYSTEM FOR FAULT ISOLATION IN AN ELECTRIC POWER STEERING SYSTEM

TECHNICAL FIELD

The disclosure generally relates to a method and system for identifying a fault in an electric power steering system.

BACKGROUND

Electric power steering (EPS) is a direct replacement for hydraulic power steering, but consumes significantly less energy during operation. EPS is especially attractive in hybrid vehicles, where the engine may or may not be running, resulting in an intermittent source of mechanical power to run a hydraulic pump, but a continuous and plentiful source of electrical power. EPS uses an electronic torque sensor to measure the steering wheel torque, and an electric motor is used to apply additional torque to the steering rack. EPS systems not only provide steering assist to drivers but they are also actuators for recently developed active safety features, such as lane keeping, and lane changing assist. It is therefore important to recognize and identify faults in the electric power steering system prior to failure so that corrective action may be taken.

SUMMARY

A method of isolating a fault in an electric power steering system of a vehicle is provided. The vehicle may include, but is not limited to, any mobile platform, such as a car, truck, bus, plane, atv, boat, tractor, etc. The method includes calculating a value for each of a plurality of fault signature components. Each of the calculated values of the plurality of fault signature components is compared to a respective threshold value for each fault signature component, to determine if any of the calculated values of the plurality of fault signature components exceeds its respective threshold value. When at least one of the calculated values of the plurality of fault signature components exceeds its respective threshold value, a control action is automatically executed to indicate a detected fault in the electric power steering system. The above threshold comparison results are compared to a fault table that indicates pre-calculated threshold comparison results for pre-identified faults, to determine if the above threshold comparison results correspond to a pre-identified fault. Based on the fault table comparison results, a control action is automatically executed to indicate a detected known fault or a detected unknown fault in the electric power steering system.

An electric power steering system for a vehicle is also provided. The electric power steering system includes a steering wheel configured to receive a set of driver steering inputs, including a steering torque and a steering angle. A torque sensor is configured to measure the steering torque, and an angle sensor is configured to measure the steering angle. The electric power steering system further includes a steering assembly, and a steering motor that is operable for passing a variable motor assist torque to the steering assembly at a torque level which depends in part on the steering angle and the steering torque. A controller includes tangible, non-transitory memory, and is operable to execute a set of instructions for identifying a fault in the electric power steering system. Specifically, the controller is operable to calculate a value for each of a plurality of fault signature components. The plurality of fault signature components include: a residual value from a motor circuit equation, the absolute value of the difference between a first self aligning torque value calculated from a tire dynamic model, and a second self aligning torque value calculated from an extended state observer and nominal parameters for the electric power steering system, a variance in the difference between the first self aligning torque value and the second self aligning torque value, an estimated motor resistance in the electric power steering system, an estimated motor back Electro-Magnetic Force (EMF) constant in the electric power steering system, and a residual value from a vehicle dynamics equation. The controller compares each of the calculated values of the plurality of fault signature components to a respective threshold value for each fault signature component, to determine if any of the calculated values of the plurality of fault signature components exceeds its respective threshold value. When at least one of the calculated values of the plurality of fault signature components exceeds its respective threshold value, a control action is automatically executed to indicate a detected fault in the electric power steering system. The above threshold comparison results are then compared to a fault table that indicates pre-calculated threshold comparison results for pre-identified faults, to determine if the above threshold comparison results correspond to a pre-identified fault. Based on the comparison of the threshold comparison results to the fault table, a control action is automatically executed to indicate a detected known fault or a detected unknown fault in the electric power steering system.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Figure 1:
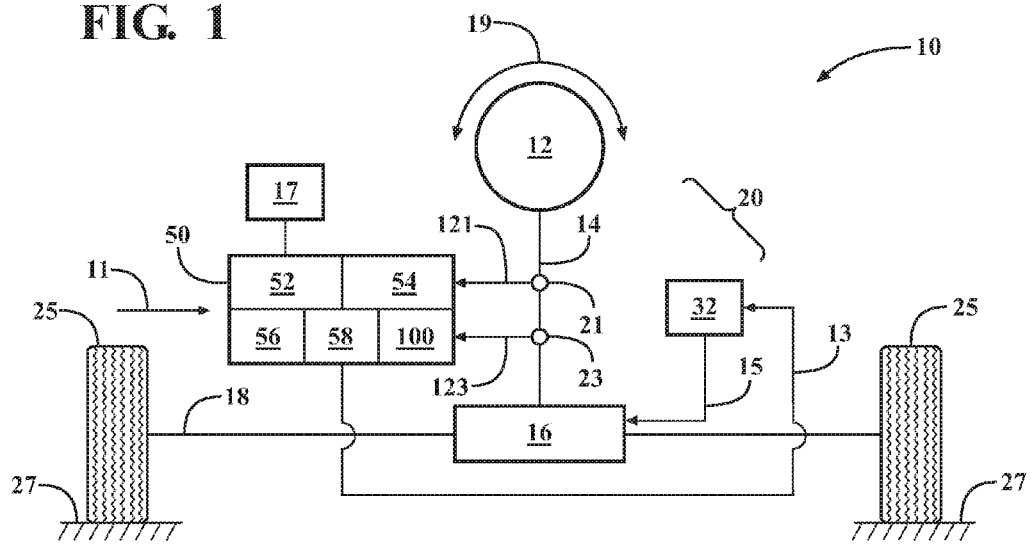
FIG. 1 is a schematic illustration of a vehicle having a steering column-mounted electric power steering (EPS) system and a controller configured for identifying known and unknown faults in the EPS system.

Referring to the drawings, wherein like reference numbers correspond to like or similar components throughout the several figures, and beginning with FIG. 1, a vehicle 10 includes a steering column-mounted electric power steering (EPS) system 20 and a controller 50. The vehicle may include, but is not limited to, any mobile platform, such as a car, truck, bus, plane, atv, boat, tractor, industrial vehicle, etc. The controller 50 is shown schematically as a single unit, however the various elements of the controller 50 may be distributed among multiple special purpose controllers or electronic control units (ECUs), e.g., a motor control unit, a steering control unit, etc. Furthermore, various elements of the controller 50 may be located off-board or outside of the vehicle, such as at a central processing location. For example, some components and/or functions of the controller 50 may be located/performed in the vehicle 10, and other components and/or functions of the controller 50 may be located remote from the vehicle 10, with data transmitted therebetween as necessary.

The present controller 50 is configured for identifying either a known or an unknown fault in the electric power steering system 20. As used herein, a "fault" in the electric power steering system 20 is defined as a deviation beyond an allowable operating range of a measurable parameter of the electric power steering system 20, relative to a calibrated, properly functioning standard. The controller 50 is further configured for executing a control action that is appropriate for the identified fault in the electric power steering system 20, such as by recording a diagnostic code and/or displaying information to a driver of the vehicle 10 via a display 17, e.g., a display screen, indicator lamp, icon, etc. Alternatively, the controller 50 may execute a control action that is remote from the vehicle, such as send an email, text, or other alert to a remote processing/maintenance facility.

The vehicle 10 includes a steering wheel 12. The steering wheel 12 rotates in response to driver steering inputs, which are collectively represented in FIG. 1 by double arrow 19. The steering wheel 12 is operatively connected to a steering column 14, which is connected in turn to a steering assembly 16. In one embodiment, the steering assembly 16 is a rack and pinion assembly, although other steering assemblies may be used depending on the design. The steering assembly 16 ultimately orients front tires 25 with respect to a road surface 27, e.g., by moving tie rods 18 on a set of front axles (not shown), as is well understood in the art.

A torque sensor 23 and an optional steering angle sensor 21 may be positioned with respect to the steering column 14. The torque sensor 23 measures and transmits a torque sensor signal (arrow 123) to the controller 50. Likewise, the steering angle sensor 21 measures and transmits a steering angle signal (arrow 121) to the controller 50. The controller 50 processes the signals 121, 123 along with additional vehicle operating data (arrow 11), e.g., vehicle velocity, mass, etc., and determines the amount of steering assistance required by a steering motor 32 for executing the present steering maneuver. The controller 50 is in communication with the steering motor 32 via motor control signals (arrow 13). The steering motor 32 responds to the motor control signals (arrow 13) by generating and delivering a motor torque (arrow 15) through a reduction gear set and to the steering assembly 16.

Still referring to FIG. 1, the controller 50 may transmit the motor control signals (arrow 13) to the steering motor 32 using a controller area network (CAN), serial bus, data router(s), and/or other suitable network connections. Hardware components of the controller 50 may include one or more digital computers, located within the vehicle 10 and/or remote from the vehicle 10, each having a microprocessor or central processing unit (CPU), read only memory (ROM), random access memory (RAM), electrically-programmable read only memory (EPROM), a high-speed clock, analog-to-digital (A/D) and digital-to-analog (D/A) circuitry, and input/output circuitry and devices (I/O), as well as appropriate signal conditioning and buffer circuitry.

Each set of algorithms or computer-executable instructions residing within the controller 50 or readily accessible and executable thereby, including any algorithms or computer instructions needed for executing the present method 100 as explained below, can be stored on tangible, non-transitory computer-readable memory 54 and executed by associated hardware portions of the controller 50 as needed to provide the disclosed functionality, either located within the vehicle 10 and/or remote from the vehicle 10. An extended state observer 52 is included as part of the software functionality of the controller 50, with the state observer 52 applying state space feedback control law, as is well understood in the art. The controller 50 is also programmed with or otherwise has access to a tire dynamics model 56 and an EPS system model 58. The operation of the tire dynamics model 56 and the EPS system model 58 to calculate a first Self Aligning Torque (SAT) and a second SAT respectively, is known to those skilled in the art, and is described in U.S. Pat. No. 8,634,986, application Ser. No. 13/075,263, which is assigned to the assignee of this disclosure. Accordingly, the operation of the tire dynamics model 56 and the EPS system model 58 to calculate a first Self Aligning Torque (SAT) and a second SAT respectively are not described in detail herein.

Figure 2:
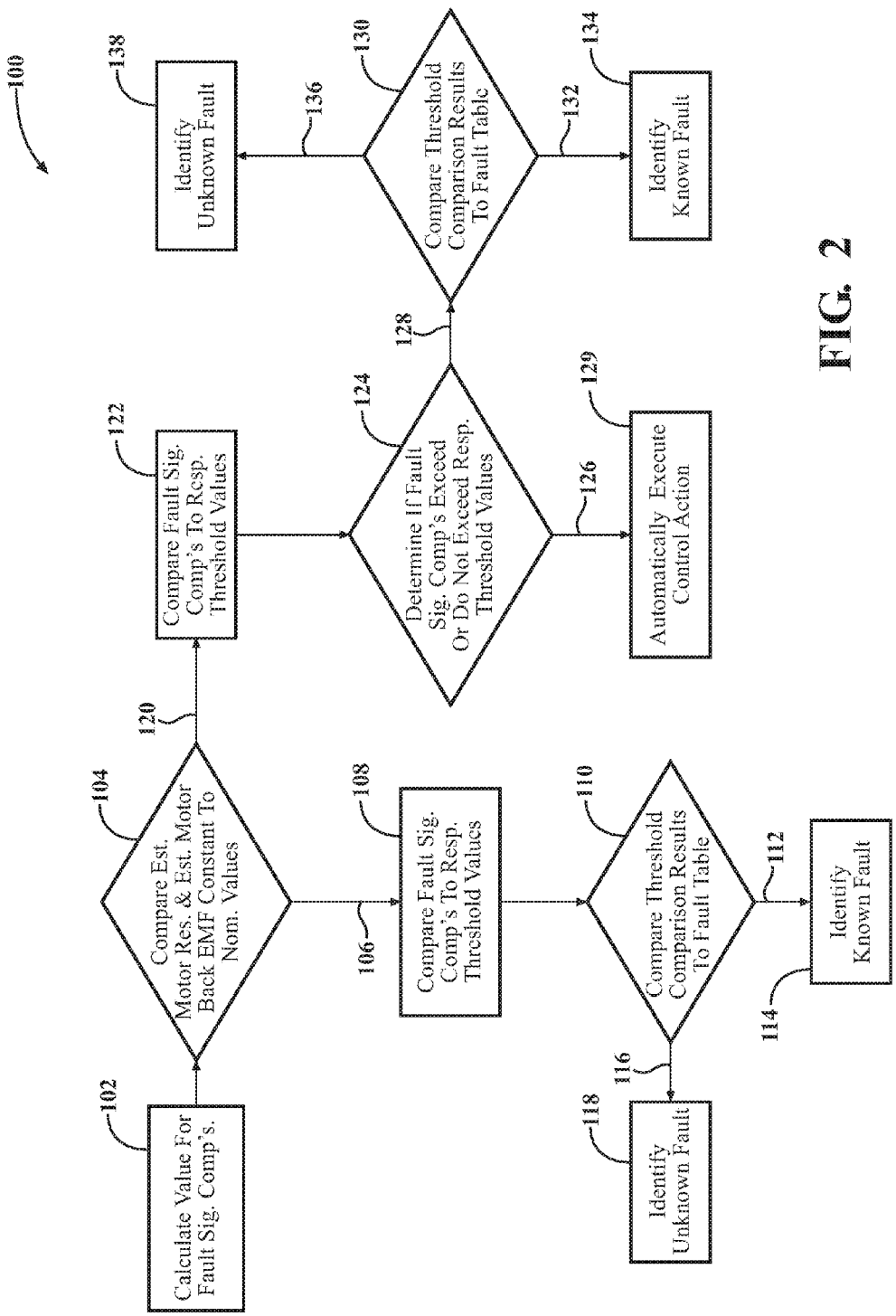
FIG. 2 is a flowchart representing a method of identifying a fault in the electric power steering system.

Referring to FIG. 2, the method 100 of isolating a fault in the electric power steering system 20 of the vehicle 10 is generally represented. The method 100 includes calculating a value for each of a plurality of fault signature components. The step of calculating the value for the fault signature components is generally indicated by box 102 in FIG. 2. The fault signature components are parameters of the electric power steering system 20 that may be monitored and/or calculated, and used to evaluate the operation of the electric power steering system 20 and/or components thereof. The fault signature components may include, but are not limited to, a residual value from a motor circuit equation, the absolute value of the difference between a first Self Aligning Torque (SAT) value calculated from a tire dynamics model 56, and a second SAT value calculated from an extended state observer 52 and nominal parameters for the electric power steering system 20, a variance in the difference between the first SAT value and the second SAT value, an estimated motor 32 resistance in the electric power steering system 20, an estimated back Electro-Magnetic Force (EMF) constant in the electric power steering system 20, and a residual value from a vehicle 10 dynamics equation.

The calculation of the first SAT value, from the tire dynamics model 56, and the second SAT value, from an extended state observer 52 and nominal parameters for the electric power steering system 20 are known to those skilled in the art. Accordingly, the process used by the controller 50 to calculate the first SAT value and the second SAT value is not described herein. The controller 50 uses known mathematical operations to calculate the absolute value of the difference between the first SAT value and the second SAT value. As used herein, the absolute value is defined as the magnitude of a real number without regard to its sign (e.g., + or −). Additionally, the controller 50 uses known mathematical operations to calculate the variance between the first SAT value and the second SAT value. As used herein, the variance is defined as the averages of the squared differences from the mean.

The residual value from the motor circuit equation may be calculated from Equation 1) below.

$$r_1 = V_m - RI_m - K_t n\dot{\theta}_p \qquad 1)$$

Referring to Equation 1), $r_1$ is the residual value of the motor circuit equation, R is a nominal value of the steering motor 32 resistance, $K_t$ is the back EMF constant nominal value, $I_m$ is the measured electrical current for the steering motor 32, n is a gear ratio between the steering motor 32 and the steering assembly 16 (e.g., rack and pinion), $V_m$ is the measured electrical potential (voltage) of the electric steering motor 32, and $\dot{\theta}_p$ is the pinion angular velocity, which can be derived (e.g., by taking time derivatives) from the measurement by steering angle sensor 21. As used herein, the term "nominal value" is defined as a normal operating value of a specific parameter.

The residual value from the vehicle 10 dynamics equation may be calculated from Equation 2) below.

$$r_2 = \dot{\psi} - \frac{V_x}{L + K_\mu V_x^2} \delta \quad \quad 2)$$

Referring to Equation 2), $r_2$ is the residual value of the vehicle 10 dynamics equation, $V_x$ is the measured longitudinal vehicle 10 speed, $K_\mu$ is an assumed nominal value of an understeer coefficient, L is an assumed nominal value of the vehicle 10 wheelbase, $\dot{\psi}$ is a measured yaw rate of the vehicle 10, and $\delta$ is the road wheel angle. The road wheel angle $\delta$ is calculated from Equation 3 below.

$$\delta = \frac{1}{n'} \theta pm \quad \quad 3)$$

Referring to Equation 3), n' is a ratio from pinion angle to Road Wheel Angle (RWA), and $\theta_{pm}$ is the measured pinion angle, which can be obtained from the steer wheel angle sensor 21.

The estimated steering motor 32 resistance in the electric power steering system 20 may be calculated using a recursive least squares with varying forgetting factor method 100. Additionally, the motor back EMF constant in the electric power steering system 20 may also be calculated using a recursive least squares with varying forgetting factor method 100. As is known to those skilled in the art, a recursive least squares filter is an adaptive filter which recursively finds the coefficients that minimize a weighted linear least squares function relating to the input signals. As is known to those skilled in the art, a forgetting factor gives exponentially less weight to older error samples. As is known to those skilled in the art, a varying forgetting factor decreases temporarily when the estimation error increases so that rapid adaption can occur, and returns to a value near 1 when estimation error decreases so that adaption can be insensitive to measurement noise.

Once the controller 50 has calculated the values for the fault signature components, the controller 50 then compares the calculated values of the estimated steering motor 32 resistance and the estimated motor back EMF constant to a respective nominal value for each respective fault signature component to determine if the calculated steering motor 32 resistance value and/or the calculated motor back EMF constant value deviate from their respective nominal values. The step of comparing the estimated motor 32 resistance and the estimated motor back EMF constant to their respective nominal values is generally indicated by box 104 in FIG. 2. If both the values for the estimated motor 32 resistance and the estimated motor back EMF deviate from their respective nominal values, then a fault may exist with one or more of the components of the electric power steering system 20.

When the controller 50 determines that both the calculated steering motor 32 resistance value and the calculated motor back EMF constant value deviate from the respective values, generally indicated at 106, then the controller 50 compares one or more of the calculated values of the fault signature components to a respective threshold value for each fault signature component, to determine if any of the calculated values of the fault signature components exceeds its respective threshold value. Comparing the fault signature components to their respective threshold value, when both the calculated or estimated steering motor 32 resistance value and the calculated or estimated motor back EMF constant value deviate from their respective nominal values is generally indicated by box 108 in FIG. 2. The respective threshold value for each of the fault signature components may be considered a maximum allowable deviation from their respective nominal values. Accordingly, a calculated value that exceeds its respective threshold value may be considered to be outside of an allowable operating range and/or indicate a fault in the power steering system.

Specifically, when the controller 50 determines that both the calculated steering motor 32 resistance value and the calculated motor back EMF constant value deviate from their respective nominal values, generally indicated at 106, then the controller 50 compares an absolute value of the residual value from the motor circuit equation to a motor threshold, the absolute value of the difference between the first SAT value and the second SAT value to a SAT error threshold, the variance in the difference between the first SAT value and the second SAT value to a SAT variance threshold, and compares an absolute value of the residual value from the vehicle 10 dynamics equation to a dynamic threshold. The controller 50 compares these fault signature components to the respective threshold values to determine if the values of the fault signature components exceed their respective threshold values. Specifically, the controller 50 determines if the absolute value of the residual value from the motor circuit equation is greater than the motor threshold, if the absolute value of the difference between the first SAT value and the second SAT value is greater than the SAT error threshold, if the variance in the difference between the first SAT value and the second SAT value is greater than the SAT variance threshold, or if the absolute value of the residual value from the vehicle 10 dynamics equation is greater than the dynamic threshold.

The comparison of the fault signature components to their respective threshold values, generally indicated by box 108 in FIG. 2, defines a threshold comparison result for reach fault signature component, referred to collectively as the threshold comparison results. The threshold comparison results indicate whether each fault signature component exceeds of does not exceed its respective threshold value. Accordingly, the threshold comparison results do not include the actual value of each of the fault signature components, but rather provide the result of the comparison to their respective threshold value, the result being that each fault signature component either exceeds or does not exceed its threshold value. The threshold comparison results provide a list, sequence or combination of results, in which all of the fault signature components exceed their respective threshold value, all of the fault signature components do not exceed their respective threshold value, or a combination in which some of the fault signature components exceed their respective threshold value and the remainder of the fault signature components do not exceed their respective threshold value.

The controller 50 then compares the threshold comparison results to a fault table. Comparing the threshold comparison results to the fault table, when both the calculated steering motor 32 resistance value and the calculated motor back EMF constant value deviate from the respective values, is generally indicated by box 110 in FIG. 2. The fault table correlates different possible combinations of the threshold comparison results, i.e., combinations of each fault signature component either exceeding or not exceeding their respective threshold value, to pre-identified or known faults. In other words, the fault table indicates pre-calculated threshold comparison results for pre-identified or known faults in the power steering system 20. In so doing, the controller 50 may determine if the fault signature component threshold comparison results correspond to a pre-identified or known fault in the electric power steering system 20.

When the estimated steering motor resistance and the estimated motor back EMF constant both deviate from their respective nominal values, the controller 50 automatically executes a control action to indicate a detected fault in the electric power steering system 20. The control action may include, but is not limited to, at least one of: recording a diagnostic code in the controller 50, displaying an icon or message within the vehicle 10, notifying a remote location/facility, sending a message, such as an email, text, etc., or some other action not specifically noted or described herein.

If the controller 50 determines that the threshold comparison results match a result of a pre-defined or known fault indicated in the fault table, generally indicated at 112, then the controller 50 identifies the specific identified fault in the electric power steering system 20 in the control action. Identifying the known or specifically identified fault in the electric power steering system 20 is generally indicated by box 114 in FIG. 2.

If the controller 50 determines that the threshold comparison results do not match or correlate to any of the known faults as defined in the fault table, generally indicated at 116, then the controller 50 executes a general control action indicating an unknown fault in the electric power steering system 20. Identifying an unknown fault in the electric power steering system 20 is generally indicated by box 118 in FIG. 2.

When the controller 50 determines that at least one of the calculated steering motor 32 resistance value and the calculated motor back EMF constant value does not deviate from their respective nominal values, i.e., at least one of the calculated steering motor 32 resistance value and the calculated motor back EMF constant are close to or near their respective nominal values, generally indicated at 120, then the controller 50 compares one or more of the calculated values of the fault signature components to their respective threshold value for each fault signature component, to determine if each of the calculated values of the fault signature components exceeds its respective threshold value or does not exceed its respective threshold value. Comparing the fault signature components to their respective threshold value, when at least one of the calculated steering motor 32 resistance value and the calculated motor back EMF constant value does not deviate from their respective nominal values, is generally indicated by box 122 in FIG. 2. As described above, the respective threshold value for each of the fault signature components may be considered a maximum allowable deviation from their respective nominal values. Accordingly, a calculated value that exceeds its respective threshold value may be considered to be outside of an allowable operating range and/or may indicate a fault in the power steering system.

Specifically, when the controller 50 determines that at least one of the calculated steering motor 32 resistance value and the calculated motor back EMF constant value does not deviate from their respective nominal values, generally indicated at 120, then the controller 50 compares the absolute value of the residual value from the motor circuit equation to the motor threshold, the absolute value of the difference between the first SAT value and the second SAT value to the SAT error threshold, the variance in the difference between the first SAT value and the second SAT value to the SAT variance threshold, the absolute value of the difference between the calculated steering motor 32 resistance value and the nominal steering motor 32 resistance value to the resistance threshold, the absolute value of the difference between the calculated motor back EMF constant value and the nominal value of the motor back EMF constant to the EMF threshold, and the absolute value of the residual value from the vehicle 10 dynamics equation to the dynamic threshold.

The controller 50 compares these fault signature components to the respective threshold values to determine if the value of each of the fault signature components exceeds their respective threshold value, or does not exceed their respective threshold value. The step of determining if the values of the fault signature components exceed or do not exceed their respective threshold value, when the controller 50 determines that at least one of the calculated steering motor 32 resistance value and the calculated motor back EMF constant value does not deviate from their respective nominal values, is generally indicated by box 124 in FIG. 2. Specifically, the controller 50 determines if the absolute value of the residual of the motor circuit equation is greater than the motor threshold, if the absolute value of the difference between the first SAT value and the second SAT value is greater than the SAT error threshold, if the variance in the difference between the first SAT value and the second SAT value is greater than the SAT variance threshold, if the absolute value of the difference between the calculated steering motor 32 resistance value and the nominal steering motor 32 resistance value is greater than the resistance threshold, if the absolute value of the difference between the calculated motor back EMF constant value and the nominal value of the motor back EMF constant is greater than the EMF threshold, or if the absolute value of the residual value from the vehicle 10 dynamics equation is greater than the dynamic threshold.

When none of the calculated values of the plurality of fault signature components exceeds their respective threshold value, generally indicated at 126, then the controller 50 may determine that the electric power steering system 20 is operating properly. If the controller 50 determines that the electric power steering system 20 is operating properly, the controller 50 may take no action, or alternatively, the controller 50 may automatically execute a control action, generally indicated by box 129 in FIG. 2, to indicate that no fault in the electric power steering system 20 has been detected. Such control action may include, for example, recording a diagnostic code in the controller 50, registering a value in a diagnostic code stored in the memory of the controller 50, sending a signal to a location remote from the vehicle, or taking some other action, either at the vehicle or remote from the vehicle.

The comparison of the fault signature components to their respective threshold value, generally indicated by box 124 in FIG. 2, defines a threshold comparison result for each fault signature component, referred to collectively as the threshold comparison results. As described above, the threshold comparison results provide a combination of results indicating whether each fault signature component exceeds or does not exceed their respective threshold value.

When at least one of the calculated values of the fault signature components exceeds its respective threshold value, generally indicated at 128, the controller 50 then compares the threshold comparison results to the fault table. Comparing the threshold comparison results to the fault table, when at least one of the calculated steering motor 32 resistance value and the calculated motor back EMF constant value does not deviate from their respective nominal values, is generally indicated by box 130 in FIG. 2. As described above, the fault table correlates different possible combinations of the threshold comparison results to pre-identified or known faults. In so doing, the controller 50 may determine if the threshold comparison results correspond to one or more of the pre-identified or known faults in the electric power steering system 20 associated with that combination of threshold comparison results.

When at least one of the calculated values of the plurality of fault signature components exceeds its respective threshold value, the controller 50 automatically executes a control action to indicate a detected fault in the electric power steering system 20. The control action may include, but is not limited to, at least one of: recording a diagnostic code in the controller 50 and/or displaying an icon or message within the vehicle 10, notifying or otherwise sending a message to a location remote from the vehicle 10, or some other action, either at the vehicle 10 or remote from the vehicle 10, not specifically described herein.

If the controller 50 determines that the threshold comparison results match a pre-defined or known fault indicated in the fault table, generally indicated at 132, then the controller 50 identifies the specific, identified fault in the electric power steering system 20 in the control action. Identifying the known or specifically identified fault in the electric power steering system 20 is generally indicated by box 134 in FIG. 2.

If the controller 50 determines that the threshold comparison results do not match or correlate to any of the known faults as defined in the fault table, generally indicated at 136, then the controller 50 executes a general control action indicating an unknown fault in the electric power steering system 20. Identifying an unknown fault in the electric power steering system 20 is generally indicated by box 138 in FIG. 2.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A method of isolating a fault in an electric power steering system of a vehicle, the method comprising:
   calculating a value for each of a plurality of fault signature components with a vehicle controller, wherein the plurality of fault signature components includes: a residual value from a motor circuit equation, the absolute value of the difference between a first self aligning torque value calculated from a tire dynamics model, and a second self aligning torque value calculated from an extended state observer and nominal parameters for the electric power steering system, a variance in the difference between the first self aligning torque value and the second self aligning torque value, an estimated motor resistance in the electric power steering system, an estimated motor back Electro-Magnetic Force (EMF) constant in the electric power steering system, and a residual value from a vehicle dynamics equation;
   comparing each of the calculated values of the plurality of fault signature components to a respective threshold value for each fault signature component, with the vehicle controller, to determine if each of the calculated values of the plurality of fault signature components exceeds its respective threshold value or does not exceed its respective threshold value; and
   automatically executing a control action, with the vehicle controller, to indicate a detected fault in the electric power steering system when at least one of the calculated values of the plurality of fault signature components exceeds its respective threshold value.

2. The method set forth in claim 1, further comprising comparing a result of the comparison, of each of the calculated values of the plurality of fault signature components to their respective threshold value, with the vehicle controller, to a fault table that relates the results of the comparison to pre-identified faults, to determine if the results of the comparison correspond to a pre-identified fault, when at least one of the calculated values of the plurality of fault signature components exceeds its respective threshold value.

3. A method of isolating a fault in an electric power steering system of a vehicle, the method comprising:
   calculating a value for each of a plurality of fault signature components with a vehicle controller;
   comparing each of the calculated values of the plurality of fault signature components to a respective threshold value for each fault signature component, with the vehicle controller, to determine if each of the calculated values of the plurality of fault signature components exceeds its respective threshold value or does not exceed its respective threshold value;
   automatically executing a control action, with the vehicle controller, to indicate a detected fault in the electric power steering system when at least one of the calculated values of the plurality of fault signature components exceeds its respective threshold value; and
   comparing a result of the comparison, of each of the calculated values of the plurality of fault signature components to their respective threshold value, with the vehicle controller, to a fault table that relates the results of the comparison to pre-identified faults, to determine if the results of the comparison correspond to a pre-identified fault, when at least one of the calculated values of the plurality of fault signature components exceeds its respective threshold value;
   wherein automatically executing a control action to indicate a detected fault in the electric power steering system when at least one of the calculated values of the plurality of fault signature components exceeds its respective threshold value includes identifying a pre-identified fault when the results of the comparison, of each of the calculated values of the plurality of fault signature components to their respective threshold value, to the fault table correlates to a pre-identified fault.

4. The method set forth in claim 2, wherein automatically executing a control action to indicate a detected fault in the electric power steering system when at least one of the calculated values of the plurality of fault signature components exceeds its respective threshold value includes identifying the fault as an unknown fault when the results of the comparison of each of the calculated values of the plurality of fault signature components to their respective threshold value do not match a known fault in the fault table.

5. The method set forth in claim 1, further comprising comparing the calculated values of the estimated motor resistance and the estimated motor back EMF constant to a respective nominal value for each, with the vehicle controller, to determine if both the calculated motor resistance value and the calculated motor back EMF constant value deviate from their respective nominal values.

6. The method set forth in claim 5, further comprising comparing an absolute value of the residual value from the motor circuit equation to a motor threshold with the vehicle controller, comparing the absolute value of the difference between the first self aligning torque value and the second self aligning torque value to a Self Aligning Torque (SAT) error threshold with the vehicle controller, comparing the variance in the difference between the first self aligning torque value and the second self aligning torque value to a SAT variance threshold with the vehicle controller, and comparing an absolute value of the residual value from the vehicle dynamics equation to a dynamic threshold with the vehicle controller, to determine if the absolute value of the residual value from the motor circuit equation is greater than the motor threshold, if the absolute value of the difference between the first self aligning torque value and the second self aligning torque value is greater than the SAT error threshold, if the variance in the difference between the first self aligning torque value and the second self aligning torque value is greater than the SAT variance threshold, or if the absolute value of the residual value from the vehicle dynamics equation is greater than the dynamic threshold, when both the calculated motor resistance value and the calculated motor back EMF constant value deviate from their respective nominal values.

7. The method set forth in claim 5, further comprising comparing an absolute value of the residual value from the motor circuit equation to a motor threshold with the vehicle controller, comparing the absolute value of the difference between the first self aligning torque value and the second self aligning torque value to a Self Aligning Torque (SAT) error threshold with the vehicle controller, comparing the variance in the difference between the first self aligning torque value and the second self aligning torque value to a SAT variance threshold with the vehicle controller, comparing the absolute value of the difference between the calculated motor resistance value and a nominal motor resistance value to resistance threshold with the vehicle controller, comparing the absolute value of the difference between the calculated motor back EMF constant value and a nominal value of the motor back EMF constant to an EMF threshold with the vehicle controller, and comparing an absolute value of the residual value from the vehicle dynamics equation to a dynamic threshold with the vehicle controller, to determine if the absolute value of the residual of the motor circuit equation is greater than the motor threshold, if the absolute value of the difference between the first self aligning torque value and the second self aligning torque value is greater than the SAT error threshold, if the variance in the difference between the first self aligning torque value and the second self aligning torque value is greater than the SAT variance threshold, if the absolute value of the difference between the calculated motor resistance value and the nominal motor resistance value is greater than the resistance threshold, if the absolute value of the difference between the calculated motor back EMF constant value and the nominal value of the motor back EMF constant is greater than the EMF threshold, or if the absolute value of the residual value from the vehicle dynamics equation is greater than the dynamic threshold, when at least one of the calculated motor resistance value and the calculated motor back EMF constant value does not deviate from their respective nominal values.

8. The method set forth in claim 7, further comprising automatically executing a control action, with the vehicle controller, to indicate that no fault in the electric power steering system has been detected when none of the calculated values of the plurality of fault signature components exceeds its respective threshold value.

9. The method set forth in claim 1, wherein the residual value from the motor circuit equation is calculated from the equation below:

$$r_1 = V_m - RI_m - K_t n \dot{\theta}_p$$

wherein $r_1$ is the residual value of the motor circuit equation, R is a nominal value of the motor resistance, $K_t$ is the motor back EMF constant nominal value, $I_m$ is the electrical current for the motor, n is a gear ratio between the motor and the rack/pinion, $V_m$ is the electrical potential (voltage) of the electric motor, and $\dot{\theta}_p$ is the is the pinion angular velocity.

10. The method set forth in claim 1, wherein the residual value from the vehicle dynamics equation is calculated from the equation below:

$$r_2 = \dot{\psi} - \frac{V_x}{L + K_\mu V_x^2} \delta$$

wherein $r_2$ is the residual value of the vehicle dynamics equation, $V_x$ is the measured longitudinal vehicle speed, $K_\mu$ is an assumed nominal value of an understeer coefficient, L is an assumed nominal value of the vehicle wheelbase, $\dot{\psi}$ is a measured yaw rate of the vehicle, and $\delta$ is the road wheel angle, wherein the road wheel angle ($\delta$) is calculated from the equation $$\delta = \frac{1}{n'} \theta pm,$$

and wherein n' is a ratio from pinion angle to road wheel angle, and $\theta_{pm}$ is the measured pinion angle.

11. The method set forth in claim 1, wherein the estimated motor resistance in the electric power steering system is calculated using a recursive least squares with varying forgetting factor method.

12. The method set forth in claim 1, wherein the motor back EMF constant in the electric power steering system is calculated using a recursive least squares with varying forgetting factor method.

13. The method set forth in claim 1, wherein automatically executing a control action includes at least one of: recording a diagnostic code, displaying an icon or message within the vehicle, sending a signal to a location remote from the vehicle.

14. An electric power steering system for a vehicle, the electric power steering system comprising:
   a steering wheel configured to receive a set of driver steering inputs, including a steering torque and a steering angle;
   a torque sensor configured to measure the steering torque;
   an angle sensor configured to measure the steering angle;
   a steering assembly;

a steering motor operable for passing a variable motor assist torque to the steering assembly at a torque level which depends in part on the steering angle and the steering torque; and a controller having tangible, non-transitory memory and operable to execute a set of instructions to:

calculate a value for each of a plurality of fault signature components, wherein the plurality of fault signature components includes: a residual value from a motor circuit equation, the absolute value of the difference between a first self aligning torque value calculated from a tire dynamics model, and a second self aligning torque value calculated from an extended state observer and nominal parameters for the electric power steering system, a variance in the difference between the first self aligning torque value and the second self aligning torque value, an estimated motor resistance in the electric power steering system, an estimated back Electro-Magnetic Force (EMF) constant in the electric power steering system, and a residual value from a vehicle dynamics equation;

compare each of the calculated values of the plurality of fault signature components to a respective threshold value for each fault signature component, to determine if each of the calculated values of the plurality of fault signature components exceeds its respective threshold value, or does not exceed its respective threshold value;

compare the calculated values of the estimated motor resistance and the estimated motor back EMF constant to a respective nominal value for each to determine if both the calculated motor resistance value and the calculated motor back EMF constant value deviate from their respective nominal value, or at least one does not deviate from their respective nominal value; and automatically execute a control action to indicate a detected fault in the electric power steering system when at least one of the calculated values of the plurality of fault signature components exceeds its respective threshold value.

15. The method set forth in claim 14, wherein the set of instructions saved on the controller are operable to compare a result of the comparison, of each of the calculated values of the plurality of fault signature components to their respective threshold value, to a fault table that relates the results of the comparison to pre-identified faults, to determine if the results of the comparison correspond to a pre-identified fault, when at least one of the calculated values of the plurality of fault signature components exceeds its respective threshold value.

16. The method set forth in claim 15, wherein automatically executing a control action to indicate a detected fault in the electric power steering system when at least one of the calculated values of the plurality of fault signature components exceeds its respective threshold value includes identifying a pre-identified fault when the results of the comparison, of each of the calculated values of the plurality of fault signature components to their respective threshold value, to the fault table correlates to a pre-identified fault.

17. The method set forth in claim 15, wherein automatically executing a control action to indicate a detected fault in the electric power steering system when at least one of the calculated values of the plurality of fault signature components exceeds its respective threshold value includes identifying the fault as an unknown fault when the results of the comparison of each of the calculated values of the plurality of fault signature components to their respective threshold value do not match a known fault in the fault table.

18. The electric power steering system set forth in claim 14, wherein the controller includes a fault table stored in the memory of the controller, and wherein the fault table is pre-defined to correlate the results of the comparison, of each of the calculated values of the plurality of fault signature components to their respective threshold value, to potential pre-identified system faults.

* * * * *